United States Patent
Ren et al.

(10) Patent No.: US 7,298,802 B2
(45) Date of Patent: Nov. 20, 2007

(54) SIR MEASURE METHOD AND APPARATUS FOR THE SAME

(75) Inventors: Feng Ren, Shenzhen (CN); Zhibin Zheng, Shenzhen (CN); Yuehua Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 971 days.

(21) Appl. No.: 10/367,838

(22) Filed: Feb. 19, 2003

(65) Prior Publication Data

US 2003/0218999 A1 Nov. 27, 2003

Related U.S. Application Data

(63) Continuation of application No. PCT/CN01/00807, filed on May 18, 2001.

(30) Foreign Application Priority Data

Aug. 21, 2000 (CN) ................................ 00 1 23831

(51) Int. Cl.
- H03D 1/04 (2006.01)
- H03D 1/06 (2006.01)
- H03K 5/01 (2006.01)
- H03K 6/04 (2006.01)

(52) U.S. Cl. ...................... 375/346; 375/347; 375/348; 375/349; 370/342

(58) Field of Classification Search ................ 370/335, 370/342; 375/346–349
See application file for complete search history.

(56) References Cited

U.S. PATENT DOCUMENTS 5,068,628 A * 11/1991 Ghoshal ..................... 331/1 A

| | | | |
|---|---|---|---|
| 6,034,952 A | 3/2000 | Dohi et al. ................. | 370/335 |
| 6,070,086 A * | 5/2000 | Dobrica ..................... | 455/522 |
| 6,404,826 B1 * | 6/2002 | Schmidl et al. ............. | 375/340 |
| 2002/0110109 A1 * | 8/2002 | Kawaguchi et al. ........ | 370/342 |

FOREIGN PATENT DOCUMENTS

| WO | EP 0863618 A2 | 9/1998 |
|---|---|---|
| WO | EP 0944201 A2 | 9/1999 |

* cited by examiner

*Primary Examiner*—David C. Payne
*Assistant Examiner*—Nader Bolourchi
(74) *Attorney, Agent, or Firm*—Bacon & Thomas, PLLC

(57) ABSTRACT

The invention discloses a signal-to-interference ratio (SIR) measurement method. The method measures interference power (I) of a single-path signal after the received signal is demodulated by the single-path demodulators of multipath receiving device at the receiving end. The total interference power is obtained by equipartition combining with the measured interference power of each single-path signal. The signal power (S) is obtained by measuring after maximum ratio combination of each single-path signal. The SIR of the received signal is the division of the signal power and the total interference power. An apparatus, implementing mentioned method, sets the interference power measurement-device in the RAKE combiner and the signal power measurement-device after the RAKE combiner. In this way, the interference measurement can effectively provide more information and can more really response to the channel variation.

8 Claims, 3 Drawing Sheets

SIR MEASURE METHOD AND APPARATUS FOR THE SAME

This application is a continuation of international Application PCT/CN01/00807, filed May 18, 2001, of which the entire disclosure of the pending, prior application is hereby incorporated by reference.

FIELD OF THE TECHNOLOGY

The present invention relates generally to CDMA mobile communication technology, and more particularly to a method and apparatus of measuring signal-to-interference ratio (SIR) at receiving end.

BACKGROUND OF THE INVENTION

SIR measurement is an important technology in a CDMA mobile communication system, and is mainly used in power control, soft hand-over and cells search etc. The SIR measurement provides real time and effective signal-to-interference ratio information for normal operation of a system. Performance of a mobile communication system is directly affected by measurement accuracy of the SIR. Conventional SIR measurement can refer to article "SIR-Based Transmit Power Control of Reverse Link for Coherent DS-CDMA Mobile Radio" (IEICE TRANS. COMMUN. VOL. E81-B, NO. 7 JULY 1998). With reference to FIG. 1, the SIR measurement procedure can be summarized as following:

1) After passing through RAKE combiner 1 of the RAKE receiver, a transmitted multipath signal is formed a single-path signal.

2) The combined RAKE signal is sent, on the one hand, to the signal power measurement-device 2 for signal power estimate, and on the other hand, to the interference power measurement-device 3 for interference power estimate. The formulas for estimate can refer to the above document.

3) The output of the signal power measurement-device 2 and interference power measurement-device 3 is divided by the divider 4 to obtain the SIR measurement value.

The conventional SIR measurement method measures SIR with the single-path signal after RAKE combining at receiving end. Nevertheless, the signal is transmitted with multipath and is received by multipath receiving technology at receiving end. Therefore, the interference measurement is unrealistic and part of the interference result is lost. Moreover, since a channel of the mobile communication system is a Rayleigh-fading channel; when the channel is at heavy fading depth, the conventional SIR measurement method cannot really reflect channel variation and cannot provide to the system accuracy and effective information.

SUMMARY OF THE INVENTION

The invention proposes a SIR measurement method and apparatus for the same. The method and the apparatus can more effectively provide information of an interference measurement, and can make a SIR measurement more accurate.

The invention is a measurement method of signal-to-interference ratio for CDMA mobile communication system. A signal is demodulated by the single-path demodulators in the RAKE combiner of the receiving end. After that, an interference power (I) of a single-path signal is measured. The measured interference power of every single-path signal is sent to an equipartition combiner to form a total interference power. Diversity combination of every single-path signal is measured to obtain the signal power (S). By dividing the measured signal power with the total interference power, the signal-to-interference ratio is obtained.

In the technical scheme, mentioned above, said total interference power obtained by equipartition combination can be further processed with smoothing filter to make the interference power and the signal-to-interference ratio more accurate.

Said interference power measurement of a single-path signal, after having been demodulated by a single-path demodulator at the receiving end, is made in every path, respectively. Said diversity combination can be maximum ratio combination or equivalence gain combination.

The invention provides a signal-to-interference ratio measurement apparatus implementing the method, mentioned above. The apparatus at least includes a RAKE combiner, a signal power measurement-device, interference power measurement-devices and a divider.

The RAKE combiner includes multiple single-path demodulators and a diversity combiner. All single-path signals outputted from the single-path demodulators are made diversity combination of multipath signal in the diversity combiner to form a single signal, which is used for signal power measurement in the signal power measurement-device.

The interference power measurement-devices are multiple devices set in the RAKE combiner. An input of every interference power measurement-device is connected to the output of the single-path demodulator, respectively. All interference power outputs measured by every interference power measurement-device are sent to an equipartition combiner for equipartition combination. The output of the equipartition combiner and the output of the signal power measurement-device are sent to the divider for division operation to obtain a signal-to-interference ratio.

The technical scheme mentioned above can further include a smoothing filter. The smoothing filter input is connected to the equipartition combiner output. The output of the equipartition combiner is further made smooth processing. The output of the smoothing filter and the output of the signal power measurement-device are sent to the divider to make a division operation to obtain the signal-to-interference ratio.

Said multiple interference power measurement-devices and multiple single-path demodulators are correspondingly connected one by one, i.e., the output of each single-path demodulator is connected to an interference power measurement-device. Said diversity combiner can be a maximum ratio combiner or an equivalent gain combiner.

The invention separates the measurement of a signal power (S) and the interference power (I). This means that S is measured after combining in the RAKE combiner and I of every path is measured before combining and a total I is formed by equipartition combination. In this way, a SIR is measured.

Since the invention measures interference power I at every path in the RAKE combiner, so the interference measurement can effectively obtain more information. Therefore, SIR value measured by the invention method is more accurate than by the conventional method.

In addition, when the invention is used in a power control system, all the original power control module will not be updated, so all the advantages of the conventional power control are remained.

EMBODIMENTS OF THE INVENTION

The invention will be described in more detail, hereinafter, with reference to drawings.

Figure 1:
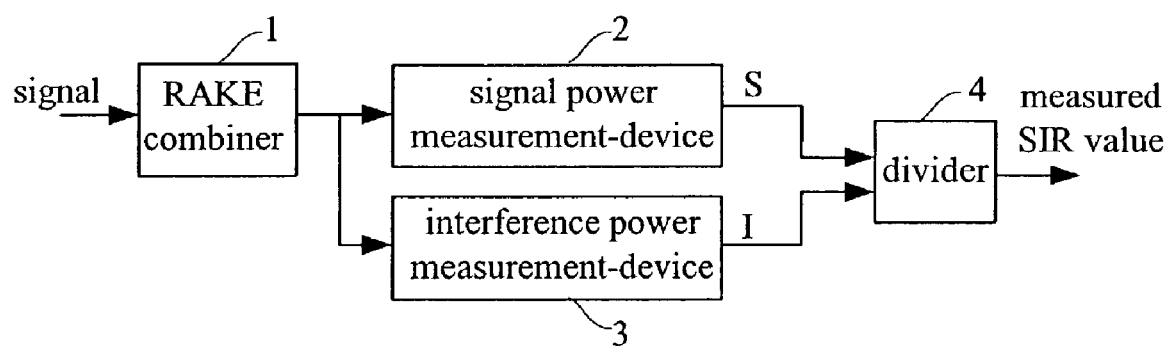
FIG. 1 shows a diagram of the conventional SIR measurement.
Figure 2:
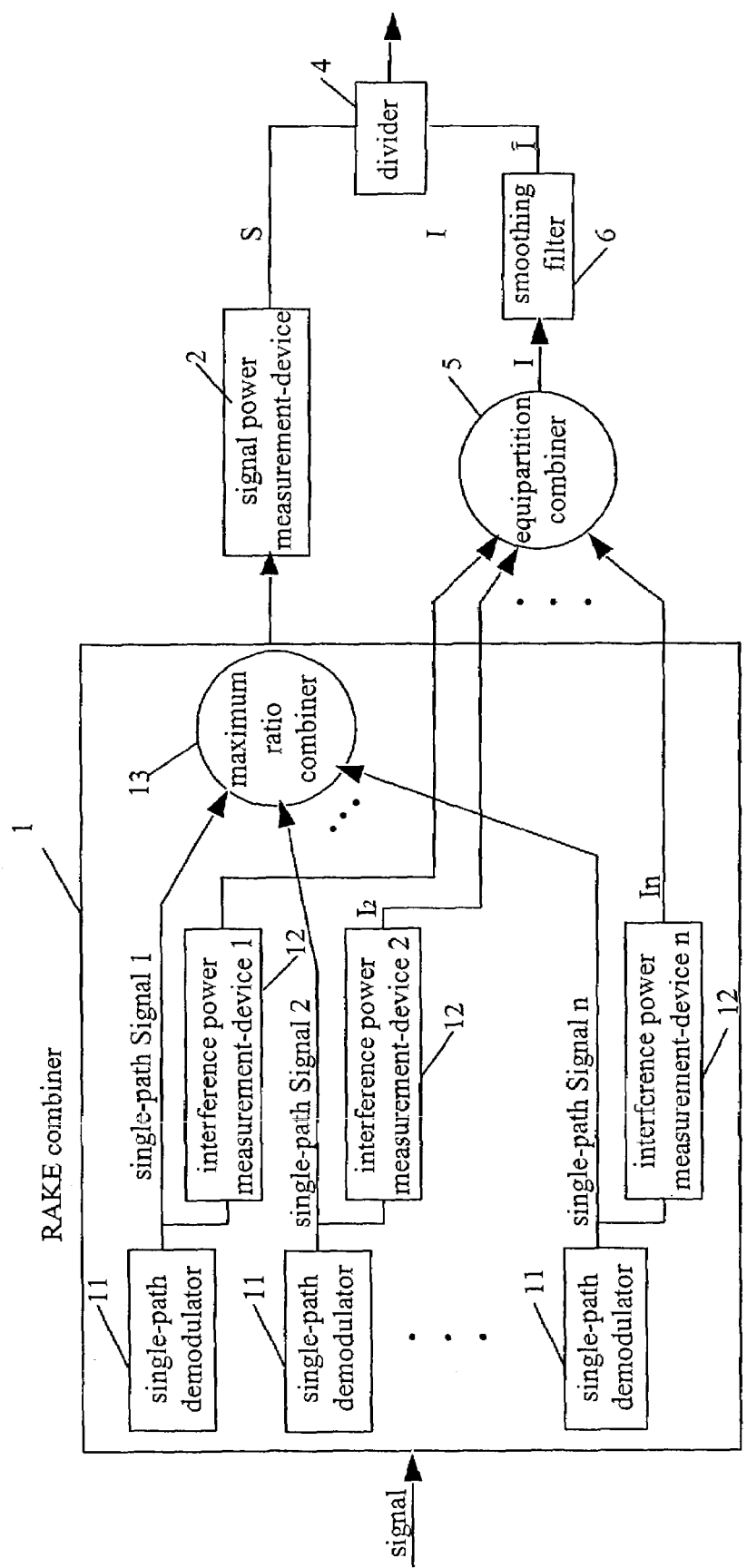
FIG. 2 shows an embodiment block diagram of the invention.

FIG. 2 is an embodiment block diagram of the invention. The specific working procedure of the embodiment is described in the following:

1. A transmitted signal, received by the multipath-receiving device at the receiving end, is demodulated by the single-path demodulators 11 in RAKE combiner 1, and then an individual-path-demodulated single-path signal is formed.

2. The individual-path-demodulated single-path signal, on the one hand, passes through the maximum ratio combiner 13 and is combined to a final signal, on the other hand, passes through interference power measurement-device 12 to make interference power estimate. The interference power measurement formula is:

$$I_i(K) = \frac{1}{N_{pilot}} \sum_{m=0}^{N_{pilot}-1} |r_i(m,k)|^2 - \left[\frac{1}{N_{pilot}} \sum_{m=0}^{N_{pilot}-1} |r_i(m,k)|\right]^2 \quad (1)$$

Wherein $I_i(k)$ is $i^{th}$ path noise interference power, $i=1, 2 \ldots n$, n is the multipath number; $N_{pilot}$ is the pilot symbol number in one frame data; $r_i(m,k)$ is the amplitude of $m^{th}$ symbol of $k^{th}$ time slot of $i^{th}$ path.

3. Taking average of measured interference power of every path through the equipartition combiner 5, the total inference power $\hat{I}$ is:

$$\hat{I}(k) = \frac{1}{n} \sum_{i=1}^{n} I_i(k) \quad (2)$$

4. The output of equipartition combiner 5 is passed through the smoothing filter 6 to smooth the interference power, functional function of the smoothing filter is:

$$\bar{I}(k) = \alpha \bar{I}(k-1) + (1-\alpha)\hat{I}(k) \quad (3)$$

Wherein, $\bar{I}(k)$ is the $k^{th}$ time slot interference power processed by the $\alpha$ filter, $\hat{I}(k)$ is the measured interference power of $k^{th}$ time slot, $\alpha$ is the regressive coefficient of the $\alpha$ filter. In a Rayleigh channel environment, since influence of multipath inference and multiuser interference, the regressive coefficient should not take a too large value.

5. The signal power measurement uses the conventional method, i.e., measuring after RAKE combining, the measurement formula is:

$$S(k) = \left[\frac{1}{N_{pilot}} \sum_{m=0}^{N_{pilot}-1} |r(m,k)|\right]^2 \quad (4)$$

6. By passing the outputs of the signal power measuring device 2 and smoothing filter 6 through divider 4, the SIR value of $k^{th}$ time slot can be obtained:

$$SIR(k) = \frac{S(k)}{\bar{I}(k)} \quad (5)$$

The output of divider 4 is taken as the real SIR measuring value. In addition, if decreasing accurate requirement of the measuring result, then the smooth processing of the inference power measurement can be neglected.

The technical scheme, mentioned above, of the invention has been used in a WCDMA (wideband CDMA) for SIR measurement of inner-loop power control. In the down link, the pilot symbol number $N_{pilot}$ is set to 4, the multipath number n is set to 2, and the Block Error Ratio (BLER) of received signal is kept at 0.01. In the RAKE combiner module, each path of the two paths is measured with formula (1). Then, the total interference power I is obtained by taking average of the measured results with formula (2). The signal power S is obtained by measuring the data signal after RAKE combining. The ratio of the signal power and interference power is the SIR measured value for inner-loop power. Con-paring the SIR measured value and the SIR threshold-value obtained by outer-loop power control, a power control command is obtained. In this way, the power control of down link is performed.

Under the same condition, by using the SIR measurement method of the invention and the conventional SIR measurement method, respectively, a power control simulation of down link is made, and the power control performance is shown in Table 1 below.

TABLE 1

| SIR measurement method | Unit | Average power | Consistency power | | |
|---|---|---|---|---|---|
| | | | 50% | 90% | 95% |
| Method of the invention | dB | −20.55 | −22.2 | −19.1 | −18.1 |
| Conventional SIR measurement method | dB | −20.16 | −22.0 | −18.3 | −17.2 |

It can be seen from Table 1 that the average power and consistency power obtained by using SIR measurement method of the invention are all lower than the average power and consistency power obtained by using the conventional SIR measurement method.

Figure 3:
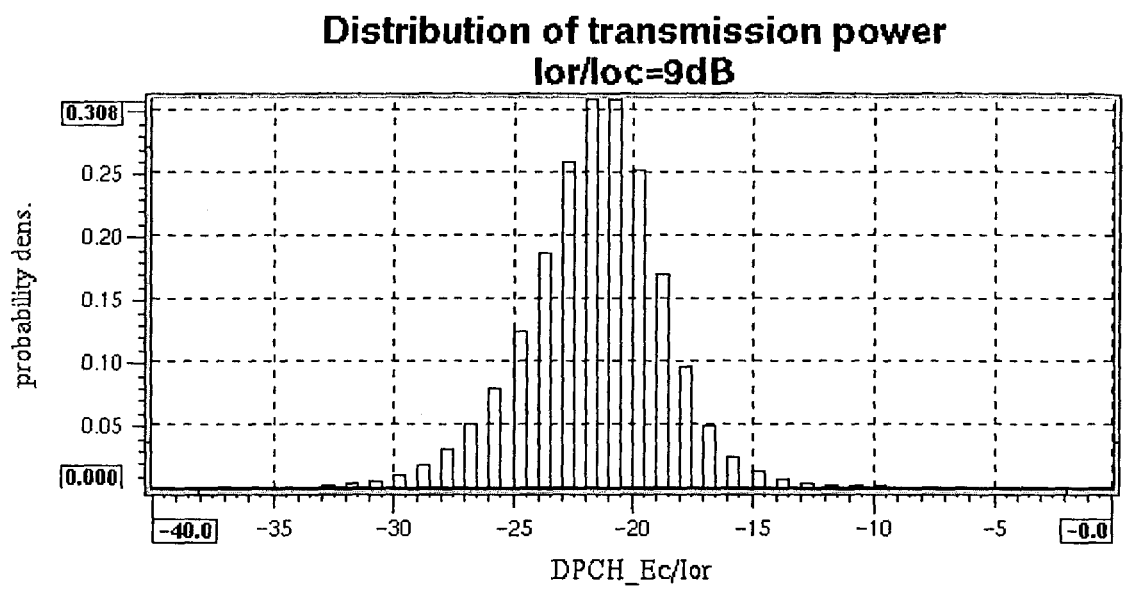
FIG. 3 is a probability density diagram of transmitting power of a base station.
Figure 4:
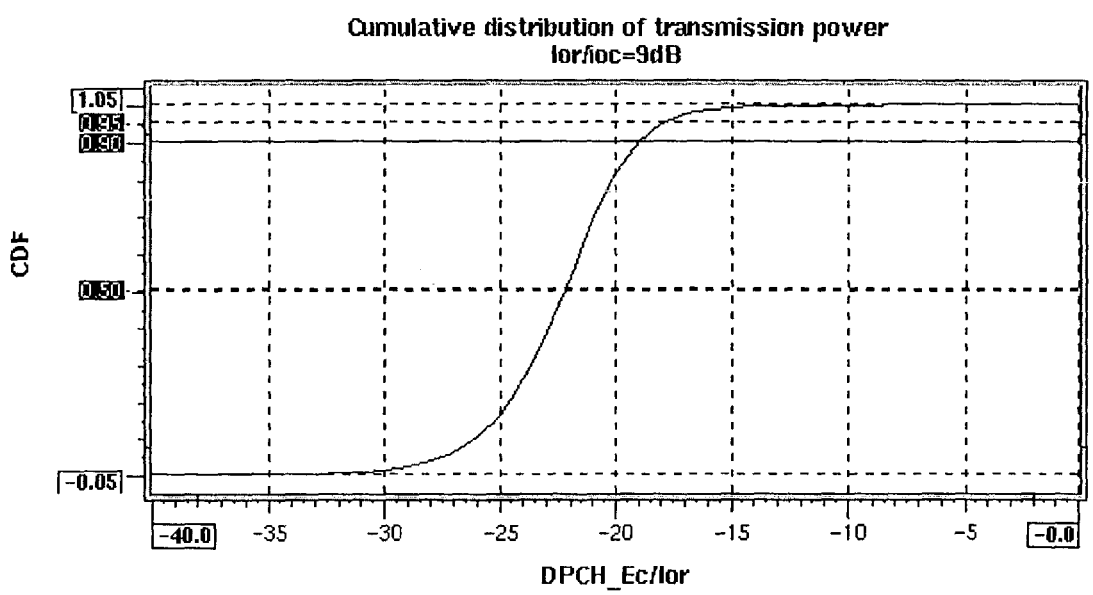
FIG. 4 is a probability distribution diagram of transmitting power of a base station.

FIG. 3 and FIG. 4 show diagrams of probability density and cumulative distribution function, respectively, of transmitting power of a base station, when making power control with the method of the invention.

Comparing the invention SIR measurement method and the conventional SIR measurement method, it can be seen that under the same service quality, the simulation performance of the invention power control is better than the simulation performance of the conventional power control. Therefore, the purpose of the invention is reached.

Above mention is only an embodiment of the invention and will not be a limit of the invention. Any equivalence change, replacement and improvement are all included in the scope of the invention claims.

The invention claimed is:

1. A signal-to-interference measurement method for a CDMA mobile communication system, comprising:
   measuring a single-path signal interference power after single-path demodulation of a received signal in a multipath receiving device at the receiving end;
   equipartition combining a measured interference power of single-path signals to obtain total interference power;
   measuring a signal power after carrying out diversity combination of the single-path signals; and
   obtaining an SIR measurement value by dividing the signal power by the total interference power.

2. The method according to claim 1, further comprising the step of smoothing the total interference power obtained from equipartition combining.

3. The method according to claim 1, wherein the single-path interference power is measured in every path.

4. The method according to claim 1, wherein the diversity combination is a maximum ratio combination or equivalence gain combination.

5. An SIR measurement apparatus, comprising a RAKE combiner, a signal power measurement-device, interference power measurement-devices and a divider; wherein the RAKE combiner comprises multiple single-path demodulators and a diversity combiner, and wherein:
   single-path signals output by the multiple single-path demodulators are all sent to the diversity combiner to carry out a multipath signal diversity combination;
   a single signal, outputted from the diversity combiner, is sent to the signal power measurement-device for measuring the signal power;
   the interference power measurement-devices are multiple units and are all set in the RAKE combiner; a respective input of every interference power measurement-device is connected to a single-path demodulator output, and measured interference power of every interference power measurement-device is sent to an equipartition combiner for equipartition combination; and
   the equipartition combiner output and output of the signal power measurement-device are sent to the divider for division operation to obtain an SIR value.

6. The method according to claim 5, wherein the equipartition combiner is connected with a smoothing filter; the equipartition combiner output is sent to the smoothing filter to carry out a smoothing operation; and, after that, the smoothing filter output and output of a respective said signal power measurement-device are sent to the divider for a division operation to obtain the SIR value.

7. The method according to claim 5, wherein the multiple interference power measurement-devices and multiple single-path demodulators are correspondingly set one by one, a respective single-path demodulator output being connected to an input of a respective one of the interference power measurement-devices.

8. The method according to claim 5, wherein the diversity combiner is a maximum ratio combiner or an equivalence gain combiner.

* * * * *